(12) United States Patent
Uyeki

(10) Patent No.: US 10,525,844 B2
(45) Date of Patent: Jan. 7, 2020

(54) SYSTEM AND METHOD FOR ELECTRIC VEHICLE CHARGING

(71) Applicant: HONDA MOTOR CO., LTD., Minato-ki, Tokyo (JP)

(72) Inventor: Robert M. Uyeki, Torrance, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 298 days.

(21) Appl. No.: 15/713,311

(22) Filed: Sep. 22, 2017

(65) Prior Publication Data

US 2019/0092176 A1     Mar. 28, 2019

(51) Int. Cl.
| B60L 53/64 | (2019.01) |
| B60L 53/14 | (2019.01) |
| B60L 53/66 | (2019.01) |
| G06Q 50/06 | (2012.01) |

(52) U.S. Cl.
CPC ............... B60L 53/64 (2019.02); B60L 53/14 (2019.02); B60L 53/665 (2019.02); G06Q 50/06 (2013.01)

(58) Field of Classification Search
CPC ........ B60L 53/64; B60L 53/14; B60L 53/665; G06Q 50/06
See application file for complete search history.

(56) References Cited

U.S. PATENT DOCUMENTS

| 2010/0017249 | A1 | 1/2010 | Fincham et al. |
| 2010/0292855 | A1 | 11/2010 | Kintner-Meyer |
| 2011/0016063 | A1* | 1/2011 | Pollack ............... G06Q 30/0208 705/412 |
| 2011/0224852 | A1* | 9/2011 | Profitt-Brown ......... B60L 53/64 701/22 |
| 2013/0179061 | A1 | 7/2013 | Gadh et al. |
| 2015/0367740 | A1* | 12/2015 | McGrath ............... B60L 11/184 320/137 |
| 2017/0088000 | A1* | 3/2017 | Payne ................. B60L 11/1838 |

FOREIGN PATENT DOCUMENTS

| CN | 103683424 A | 3/2014 |
| JP | 2000-209707 A | 7/2000 |
| JP | 2011-15521 A | 1/2011 |
| JP | 2012-186906 A | 9/2012 |

(Continued)

*Primary Examiner* — Drew A Dunn
*Assistant Examiner* — Sailesh Thapa
(74) *Attorney, Agent, or Firm* — Arent Fox LLP

(57) ABSTRACT

A vehicle charging system may determine a charging schedule for an electric vehicle based on real-time cost information and a likelihood of communication errors related to charging commands. The vehicle charging system may determine a first cost to immediately charge the electric vehicle upon plug-in. The vehicle charging system may determine a second cost to delay charging the electric vehicle according to a charging schedule, the charging schedule including communicating charging commands with the vehicle at a later time. The vehicle charging system may determine a likelihood of communication errors related to the charging commands. The vehicle charging system may select a charging option of immediately charging the electric vehicle or delaying charging the electric vehicle based on the first cost, second cost, and the likelihood of communication errors.

20 Claims, 7 Drawing Sheets

(56) References Cited

FOREIGN PATENT DOCUMENTS

| | | |
|---|---|---|
| JP | 2015/122868 A | 7/2015 |
| JP | 2015-141465 A | 8/2015 |
| KR | 2013-0051568 A | 5/2013 |
| KR | 3 054552 A1 | 8/2016 |
| TW | 201615454 A | 5/2016 |

\* cited by examiner

SYSTEM AND METHOD FOR ELECTRIC VEHICLE CHARGING

BACKGROUND

Electric vehicles may be charged using electricity from a power grid supplied by one or more electric utility companies. The supply and demand for electricity may vary over time, leading to fluctuations in real-time prices. In particular, in a power grid supplied by renewable energy such as wind and solar power, the supply of energy may be constrained at certain times due to weather conditions.

Additionally, owners of electric vehicles may be concerned about the environmental impact of charging the electric vehicles. For example, power generated from renewable resources may have less of a negative environmental impact than power generated from fossil fuels.

The owner of an electric vehicle may not have access to complete information regarding the costs of charging the electric vehicle. Accordingly, an owner attempting to save money or reduce the environmental impact of charging a car may not be able control the charging of the electric vehicle to meet the desired goals.

In view of the foregoing, there is a need for systems and methods for charging electric vehicle that account for monetary and environmental costs. Further advantages will become apparent from the disclosure provided below.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

According to one aspect of the present disclosure, a method of charging an electric vehicle may include determining a first cost to immediately charge the electric vehicle upon plug-in. The method may include determining a second cost to delay charging the electric vehicle according to a charging schedule, the charging schedule including communicating charging commands with the vehicle at a later time. The method may include determining a likelihood of communication errors related to the charging commands. The method may include selecting a charging option of immediately charging the electric vehicle or delaying charging the electric vehicle based on the first cost, second cost, and the likelihood of communication errors.

According to another aspect of the present disclosure, a vehicle charging system includes a memory storing computer executable instructions and a processor that executes the computer executable instructions. The processor may determine a first cost to immediately charge the electric vehicle upon plug-in. The processor may determine a second cost to delay charging the electric vehicle according to a charging schedule, the charging schedule including communicating charging commands with the vehicle at a later time. The processor may determine a likelihood of communication errors related to the charging commands. The processor may select a charging option of immediately charging the electric vehicle or delaying charging the electric vehicle based on the first cost, second cost, and the likelihood of communication errors.

In another aspect, the disclosure provides a non-transitory computer-readable medium storing computer executable code for charging an electric vehicle. The non-transitory computer-readable medium includes code to determine a first cost to immediately charge the electric vehicle upon plug-in. The non-transitory computer-readable medium includes code to determine a second cost to delay charging the electric vehicle according to a charging schedule, the charging schedule including communicating charging commands with the vehicle at a later time. The non-transitory computer-readable medium includes code to determine a likelihood of communication errors related to the charging commands. The non-transitory computer-readable medium includes code to select a charging option of immediately charging the electric vehicle or delaying charging the electric vehicle based on the first cost, second cost, and the likelihood of communication errors.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative aspects of the disclosure when read in conjunction with the accompanying drawings, wherein:

DETAILED DESCRIPTION

The following includes definitions of selected terms employed herein. The definitions include various examples and/or forms of components that fall within the scope of a term and that may be used for implementation. The examples are not intended to be limiting.

A "processor," as used herein, processes signals and performs general computing and arithmetic functions. Signals processed by the processor may include digital signals, data signals, computer instructions, processor instructions, messages, a bit, a bit stream, or other computing that may be received, transmitted and/or detected.

A "bus," as used herein, refers to an interconnected architecture that is operably connected to transfer data between computer components within a singular or multiple systems. The bus may be a memory bus, a memory controller, a peripheral bus, an external bus, a crossbar switch, and/or a local bus, among others. The bus may also be a vehicle bus that interconnects components inside a vehicle using protocols, such as Controller Area network (CAN), Local interconnect Network (LIN), among others.

A "memory," as used herein may include volatile memory and/or non-volatile memory. Non-volatile memory may include, for example, ROM (read only memory), PROM (programmable read only memory), EPROM (erasable PROM) and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDR SDRAM), and/or direct RAM bus RAM (DRRAM).

An "operable connection," as used herein may include a connection by which entities are "operably connected", is one in which signals, physical communications, and/or logical communications may be sent and/or received. An operable connection may include a physical interface, a data interface and/or an electrical interface.

A "vehicle," as used herein, refers to any moving vehicle that is powered by any form of energy. A vehicle may carry human occupants or cargo. The term "vehicle" includes, but is not limited to: cars, trucks, vans, minivans, SUVs, motorcycles, scooters, boats, personal watercraft, and aircraft. In some cases, a motor vehicle includes one or more engines.

Generally described, the present disclosure provides for a smart charging system for an electric vehicle, in which a remote charging controller issues charging commands to the electric vehicle. The remote charging controller may be a manufacturer or third party system that receives information from one or more electric vehicles as well as from an electric power provider. The remote charging controller may determine a charging schedule for a vehicle, optimizing for one or more costs such as monetary cost or environmental cost. Further, the remote charging controller may consider communications costs and the risk that communications between the remote charging controller and the electric vehicle may fail.

Figure 1:
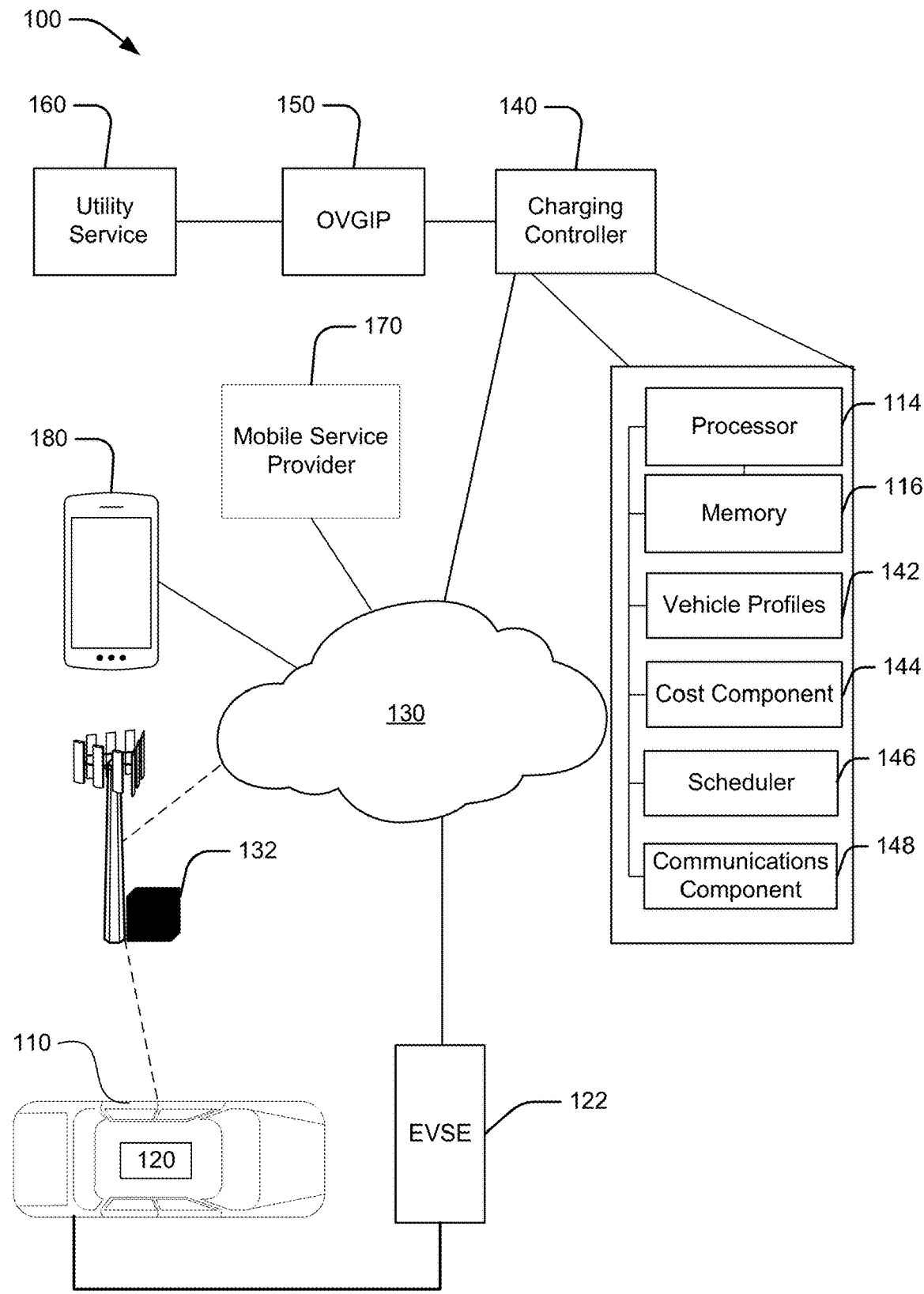
FIG. 1 illustrates an exemplary network for managing a vehicle charging system in accordance with aspects of the present disclosure.

Turning to FIG. 1, a schematic view of an example operating environment 100 of a vehicle charging system 120 within an electric vehicle 110 and example methods according to an aspect of the disclosure are provided. The operating environment 100 may include an electric vehicle supply equipment (EVSE) 122 for providing an electric charge to the electric vehicle 110, a network 130 including an access network 132 for communication between various entities, a charging controller 140 for controlling charging of the electric vehicle 110, a utility service 160 for providing charging power to the EVSE 122, an Open Vehicle-Grid Integration Platform (OVGIP) 150 for facilitating communication between the utility service 160 and the charging controller 140, and a mobile service provider 170 for providing wireless communications to the electric vehicle 110 and/or a vehicle owner's mobile device 180.

The vehicle charging system 120 may reside within a vehicle 110. The vehicle 110 may be an electric vehicle, which may include a vehicle that uses stored electric power to provide a motive force. For example, an electric vehicle may include a plug-in hybrid vehicle that uses a combination of stored electric power and combustible fuel. The vehicle 110 may include one or more batteries for storing electric power. The components of the vehicle charging system 120, as well as the components of other systems, hardware architectures, and software architectures discussed herein, may be combined, omitted or organized into various implementations. An example implementation of a vehicle 110 is discussed in further detail regarding FIG. 2.

The vehicle 110 may be connected to an electric vehicle supply equipment (EVSE) 122 to obtain an electric charge. Various types of EVSE 122 may be selected by the vehicle owner. A home EVSE 122 may be installed in the home of the vehicle owner. The owner may pay a periodic (e.g., monthly) utility bill for electricity consumed for charging the vehicle 110 along with other electricity used in the home. A travel EVSE 122 may be a portable unit or cable that can be plugged into a standard electric supply outlet. A manufacturer EVSE 122 may be a charging station supplied by a vehicle manufacturer, typically in a public location, that allows vehicles from the manufacturer to charge. A manufacturer EVSE 122 may provide a charge at no monetary cost to the vehicle owner, or may charge the vehicle owner. A commercial EVSE 122 may be a charging station operated by a party that charges for use of the charging station or electric power supplied. The vehicle 110 may detect connection of the EVSE 122 to the vehicle's charging port. A charging controller 140 may be configured to communicate with some EVSE 122, but may be unable to communicate with other EVSE.

A network 130 may be a communications network that facilitates communications between multiple systems. For example, the network 130 may include the Internet. The network 130 may enable the vehicle charging system 120 to communicate with a mobile device 180, a mobile service provider 170, and/or a charging controller 140. In an aspect, the network 130 may include an access network 132 connecting the vehicle 110 to the network 130. The access network 132 may be a wireless access network using radio-frequency (RF) signals via a terrestrial base station or satellite base station. The network 130, and the access network 132 in particular, may experience communication errors. For example, an EVSE 122 may be located indoors or underground, such as in a parking facility, where RF signals may be weakened or blocked. As another example, the network 130 or access network 132 may experience communication errors due to network traffic. A communication between the vehicle 110 and the charging controller 140 may be dropped due to congestion.

The mobile device 180 may be a personal mobile device of a driver of a vehicle. The mobile device 180 may also be connected to the network 130, for example, via the access network 132 or another access network. The mobile device 180 may have different contact information than the vehicle charging system 120. For example, the mobile device 180 may have a telephone number, a device identifier (e.g., a mobile equipment identifier (MEID), an electronic serial number (ESN), or an international mobile equipment identifier (IMEI)), an IP address, an email address, and/or a username associated with a service or application. The mobile device 180 may be registered in association with the vehicle 110 with one or more of the mobile service provider 170, charging controller 140, or within the vehicle 110. The vehicle charging system 120 of vehicle 110 or charging controller 140 may determine the contact information of the mobile device 180 via one or more registrations. The mobile device 180 associated with the vehicle 110 may receive a notification regarding a charging status of the vehicle 110. For example, the notification may be a request for the vehicle owner to approve an updated charging schedule. As another example, the notification may indicate a failure of a charging command sent to the vehicle. The notification may include instructions for manually restarting a charging procedure to provide the requested charge.

The mobile service provider 170 may be an entity that provides service to the mobile device 180 and/or the vehicle 110. For example, the vehicle 110 may include a communications device having a wireless modem that operates on a cellular network. The mobile service provider 170 may store information regarding the vehicle 110 and/or a user thereof or mobile device 180 associated with the vehicle 110. For example, the vehicle 110 may share an account with the mobile device 180.

The charging controller 140 may include a computer system (e.g., a computer server) that provides a remotely controlled charge service to electric vehicles 110. In an aspect, the charging controller 140 may be associated with one or more vehicle manufacturers or dealers. The charging controller 140 may receive a charging request when an electric vehicle 110 associated with the remotely controlled charge service is connected to an EVSE 122. The charging request may include vehicle information including, for example, a vehicle identifier, a location (e.g., latitude/longitude), a state of charge (SOC) of the vehicle 110, a charging level, an estimated charge time, and/or a charging duration. The charging controller may determine a charging schedule for the electric vehicle 110. The charging schedule may optimize a cost of charging the electric vehicle 110 based on the charging request, vehicle preferences, and real-time electric power pricing. The charging controller may transmit charging commands to the electric vehicle 110 to implement the charging schedule.

The charging controller 140 may include a processor 114 and a memory 116 that communicate with a with vehicle profile storage 142, a cost component 144, a scheduler 146, and a communications component 148. The vehicle profile storage 142 may store vehicle profiles, which may include charging preferences of the vehicle owner and/or a history of charging requests.

The scheduler 146 may include software executed by the processor 114 to determine a charging schedule for the vehicle 110 based on the vehicle information, cost information, and/or vehicle profiles. The scheduler 146 may optimize one or more costs while satisfying constraints of the charging request. For example, the scheduler 146 may determine a charging schedule that meets the desired charge level at the departure time while minimizing one or both of monetary and environmental costs. The scheduler 146 may use rules stored in the vehicle profile to determine whether to optimize for monetary cost or environmental cost if there is a conflict.

The cost component 144 may include software executed by processor 114 to determine a cost of charging an electric vehicle 110. The cost component 144 may be configured to determine one or more costs for satisfying the charging request from the vehicle 110. For example, the cost component 144 may determine a first cost to immediately charge the electric vehicle upon plug-in and a second cost to delay charging the electric vehicle. The cost component 144 may communicate with a utility service 160, for example via an Open Vehicle-Grid Integration Platform (OVGIP) 150. The cost component 144 may obtain cost information from the utility service 160. The cost information may include monetary cost (e.g., price per kilowatt-hour (kWh)) as well as environmental cost information. For example, in an aspect, environmental costs may be measured as carbon dioxide ($CO_2$) emissions. The cost information may be provided in real-time. That is, the costs may change based on changing supply and demand and may be updated periodically, (e.g., every minute, hour, or other period). The cost component 144 may determine the current costs in response to a charging request, a demand response signal, or an excess renewables signal.

The communications component 148 may include hardware (e.g., a network interface) and software executed by the processor 114 to communicate with the electric vehicle 110. For example, the communications component 148 may receive charging requests from the electric vehicle 110 and transmit charging commands to the electric vehicle 110. The communications component 148 may also evaluate the likelihood of communication errors on the link between the charging controller 140 and the electric vehicle 110 via the network 130. For example, the communications component 148 may communicate with a mobile service provider 170 operating the access network 132 to obtain notifications of any network outages. The communications component 148 may also obtain network traffic information from the mobile service provider 170 and correlate network traffic levels with communication errors. The communications component 148 may determine a link quality for the electric vehicle 110 based on a signal strength reported by the electric vehicle 110.

In an aspect, the utility service 160 may issue a demand response signal, which may indicate that demand for electric power is too high. For example, the demand for electric power may be approaching a limit on capacity of the utility service to generate electricity. In another aspect, the utility service 160 may issue an excess renewable energy signal. An excess renewable energy signal may indicate that electricity production from sources such as wind or solar is higher than expected. The excess renewable energy signal may be associated with an incentive to consume electric power such as a discount or rebate. The charging controller 140 may determine new charging schedules for vehicles 110 in response to the demand response signal or the excess renewable energy signal. For example, in response to a demand response signal, the charging controller 140 may identify vehicles 110 that may delay charging until overall demand has decreased. As another example, in response to an excess renewable energy signal, the charging controller 140 may identify vehicle 110 that are currently on a delayed schedule and may shift one or more charging periods earlier to take advantage of incentives. The charging controller 140 may send an updated charging schedule to the vehicles 110. In an aspect, the charging controller 140 may send a notification to a mobile device 180 associated with the vehicle 110 to obtain permission from the vehicle owner before changing a charging schedule.

Figure 2:
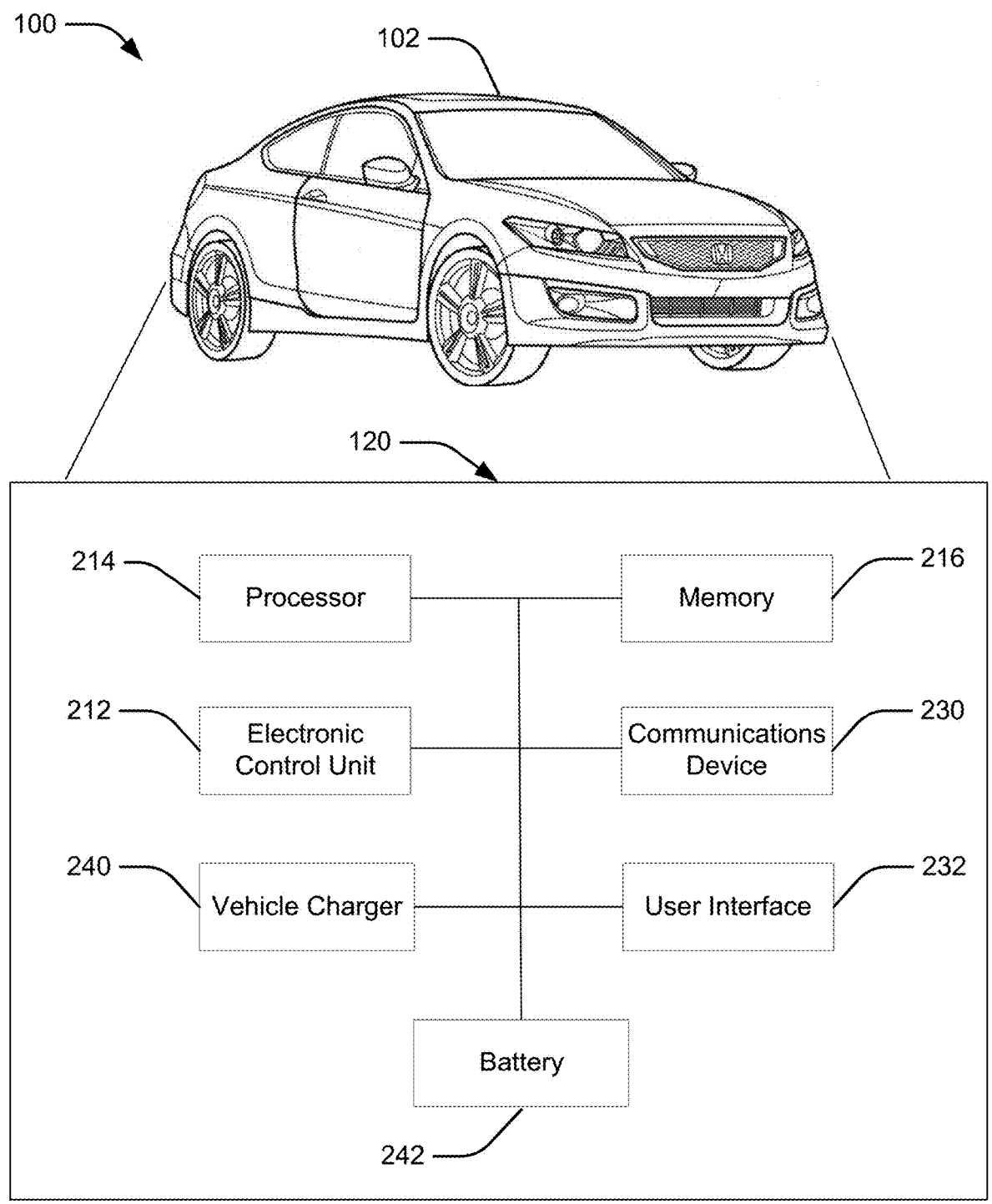
FIG. 2 illustrates a schematic view of an example electric vehicle including a charging system in accordance with aspects of the present disclosure.

Turning now to FIG. 2, the vehicle 110 may generally include an electronic control unit (ECU) 212 that operably controls a plurality of vehicle systems. The vehicle systems may include, but are not limited to, the vehicle charging system 120 among others including vehicle HVAC systems, vehicle audio systems, vehicle video systems, vehicle infotainment systems, vehicle telephone systems, and the like. The vehicle charging system 120 may include a processor 214 and a memory 216 that communicate with a communications device 230, user interface 232, vehicle charger 240, and battery 242.

The ECU 112 may include internal processing memory, an interface circuit, and bus lines for transferring data, sending commands, and communicating with the vehicle systems. The ECU 112 may include an internal processor and memory, not shown. The vehicle 110 may also include a bus for sending data internally among the various components of the vehicle charging system 120.

The vehicle charging system 120 may include a communications device 230 (e.g., wireless modem and/or transmitter) for providing wired or wireless computer communications utilizing various protocols to send/receive electronic signals internally with respect to features and systems within the vehicle 110 and with respect to external devices. These protocols may include a wireless system utilizing radio-frequency (RF) communications (e.g., IEEE 802.11 (Wi-Fi), IEEE 802.15.1 (Bluetooth®)), a near field communication system (NFC) (e.g., ISO 13157), a local area network (LAN), a wireless wide area network (WWAN) (e.g., cellular) and/or a point-to-point system. Additionally, the communications device 230 of the vehicle 110 may be operably connected for internal computer communication via a bus (e.g., a CAN or a LIN protocol bus) to facilitate data input and output between the electronic control unit 112 and vehicle features and systems. In an aspect, the communications device 230 may transmit charging requests to the charging controller 140 and receive charging schedules and/or charging commands from the charging controller 140. The communications device 230 may monitor for charging commands while the vehicle 110 is charging in case there is a new charging command or charging schedule. For example, if the vehicle charging system 120 is first instructed to delay charging until a specific time, the communications device 230 may receive a charging command to begin charging earlier if a real-time electricity cost drops or if there is an expectation of communication network errors.

The vehicle charging system 120 may include a user interface 232 that allows a user to input selection of charging options. For example, the user interface 232 may be a vehicle infotainment system including a display screen and controls in the form of buttons, dials, touch screen, and/or touch pads. The user interface 232 may request that the user enter charging parameters such as a desired departure time and a cost optimization preference (e.g., monetary cost or environmental cost).

The vehicle charger 240 may include hardware for charging the battery 242 of the electric vehicle. In an aspect, the vehicle charger 240 includes a charging receptacle for connecting to a charging plug. The charging receptacle and charging plug may conform to one or more charging standards such as, but not limited to: J1772, SAE-J1772, CHAdeMO, SAE Combo Charging System (CCS), and GB/T 20234. The vehicle charger 240 may include a rectifier for converting alternating current (AC) to direct current (DC). The vehicle charger 240 may include a control circuit for communicating with the EVSE 122 according to an applicable charging standard. For example, the control circuit may indicate properties to be used for charging such as a voltage, current, and duty cycle. The vehicle charger 240 and/or ECU 212 may also obtain charging parameters from the EVSE 122 and/or the battery 242. For example, the vehicle charger 240 may determine the SOC of the battery 242 or a charge capability (e.g., L1, L2, L3) of the EVSE 122.

Figure 3A:
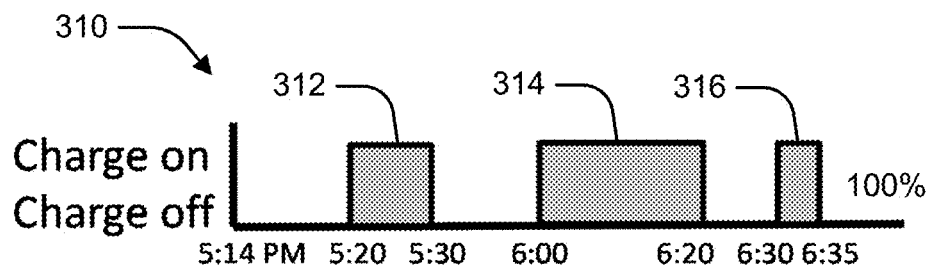
FIGS. 3A, 3B, and 3C illustrate examples of charging schedules and the effect of communication errors thereupon in accordance with aspects of the present disclosure.
Figure 3B:
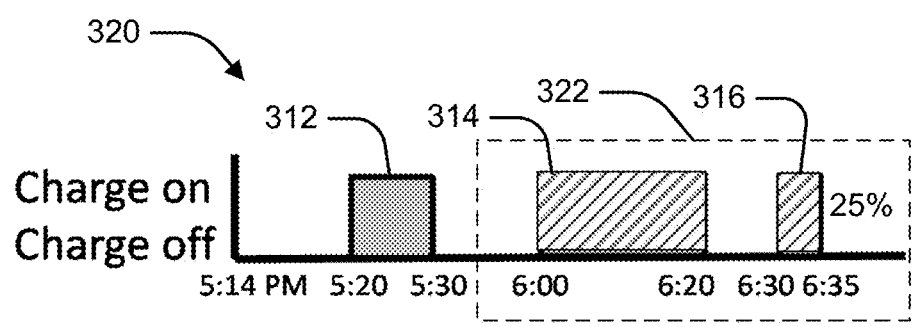
Figure 3C:
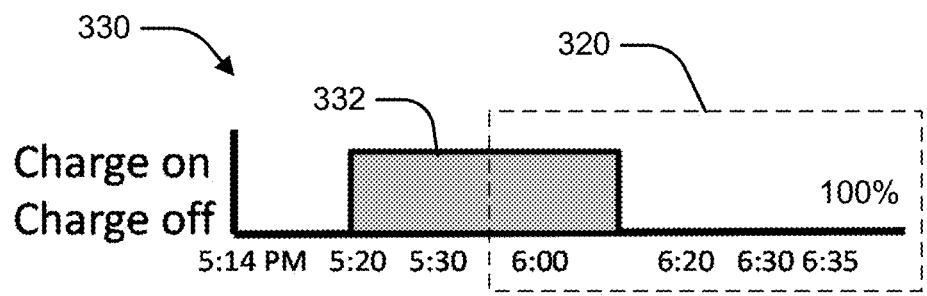

FIGS. 3A, 3B, and 3C illustrate examples of charging schedules and the effect of communication errors thereupon. In FIG. 3A, the charging controller 140 may determine a charging schedule 310 for the vehicle 110. For example, the charging schedule 310 may charge the vehicle 110 during periods of time an electricity cost is relatively low. The charging schedule 310 may include a first charging period 312, a second charging period 314, and a third charging period 316. The charging controller 140 may send a start command to start each charging period and a stop command to stop each charging period. The vehicle charging system 120 may execute the charging commands to charge the battery 242 to a desired charge level (e.g., 100%).

In FIG. 3B, the charging schedule 320 may have the same charging periods as the charging schedule 310. The vehicle 110 may experience a period of unreliable communications 322. During the period of unreliable communications 322, the vehicle 110 may not receive one or more charging commands transmitted by the charging controller 140. When no charging command is received, the vehicle charging system 120 may continue to operate according to the last received command. For example, as illustrated, the vehicle 110 may not receive the start command to start the second charging period 314. Accordingly, the vehicle 110 may not be charging during the second charging period 314. Similarly, the vehicle 110 may not receive the start command to start the third charging period 316, and the vehicle 110 may not be charging during the third charging period 316. Therefore, after the third charging period 316, the vehicle 110 may not reach the desired charging level and may have a lower SOC (e.g., 25%).

In FIG. 3C, the charging schedule 330 may avoid a risk of unreliable communications. The charging controller 140 may determine that the period of unreliable communications 322 overlaps the charging schedule 320. Accordingly, the charging controller 140 may modify the charging schedule 320 to generate the charging schedule 330 that includes a single charging period 332 to reach the desired charging level. Accordingly, the vehicle 110 does not need to receive a start command during the period of unreliable communications 322. Even if the stop command at the end of the single charging period 332 is not received, the vehicle charging system 120 may automatically stop charging upon reaching the desired charge level.

Figure 4:
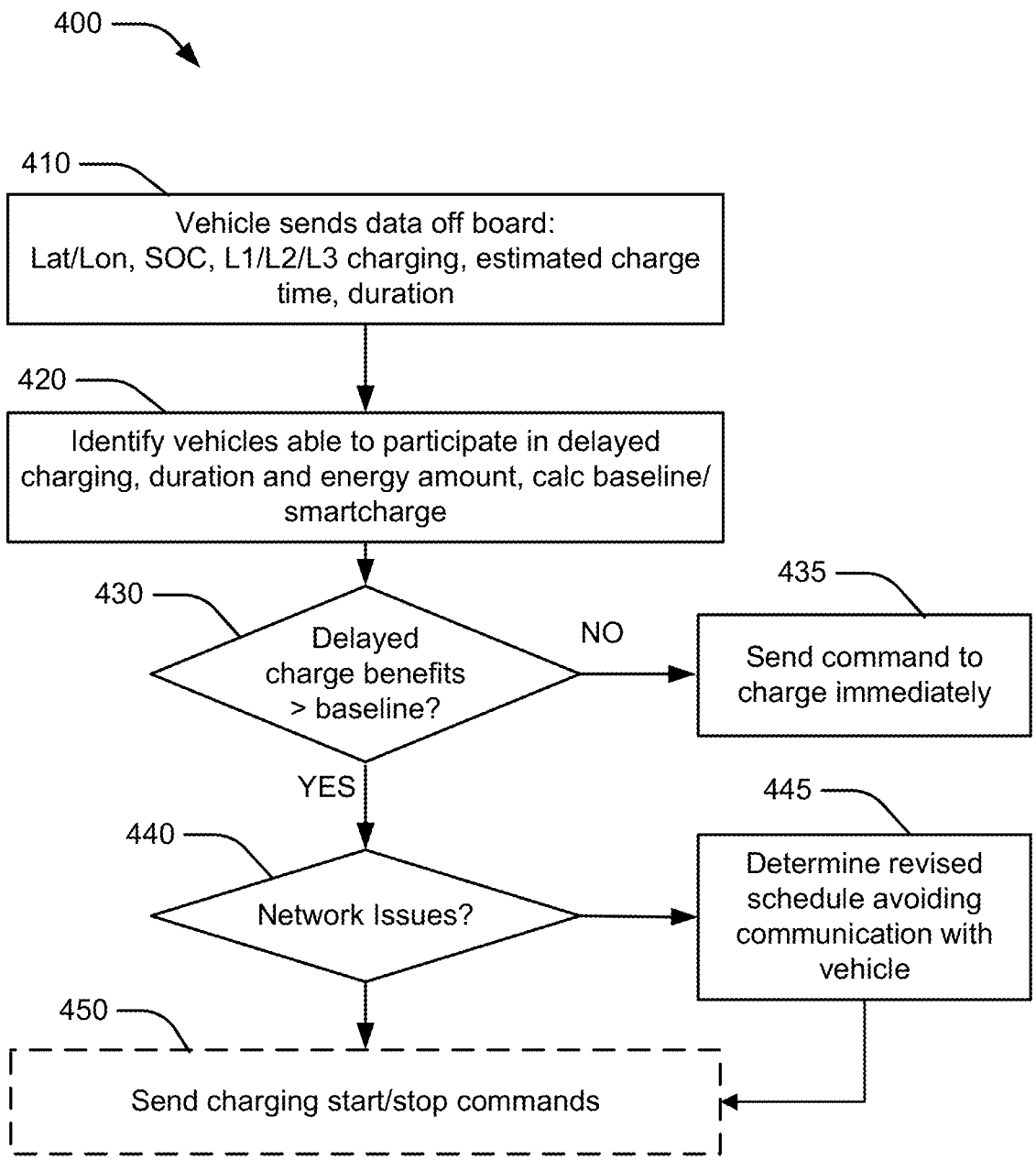
FIG. 4 illustrates a flowchart showing an exemplary method for managing an electric vehicle charging schedule.

FIG. 4 illustrates a flowchart showing an exemplary method 400 for determining a charging schedule for an electric vehicle 110. The method 400 may be performed by a charging controller 140 and the electric vehicle 110.

In block 410, the method 400 may include the vehicle sending data off board. For example, the vehicle 110 may send a charging request including parameters such as, for example, a location (latitude/longitude), a SOC, charging level, estimated charging time and estimated charging duration. The vehicle charging system 120 may determine the parameters based on the battery 242 and the EVSE 122.

In block 410, the method 400 may include determining a delayed charging schedule and a baseline charging schedule for one or more vehicles able to participate in delayed charging based on the charging parameters. For example, the charging controller 140 may determine a set of vehicle eligible to participate in delayed charging based on the location of the vehicles being within a defined geographic area. For example, the defined geographic area may be served by a single power utility service 160 and subject to the same rates. The charging controller 140 may execute the scheduler 146 to determine the delayed charging schedule by optimizing for one or more costs. For example, the scheduler 146 may select the lowest cost time periods available before the estimated departure time that will provide the desired charge level.

In block 430, the method 400 may include comparing the delayed charge benefits to the baseline charging schedule. Although direct costs for the delayed charging benefits should generally be less than a baseline charging schedule due to optimization, the delayed charging may include additional costs. For example, the delayed charging schedule may include costs associated with additional communication between the vehicle 110 and the charging controller 140. The baseline charging schedule may also be eligible for a demand response incentive (e.g., if the utility service 160 indicates a current low demand). If the delayed charging benefits are greater than the benefits of the baseline charging schedule, the method 400 may proceed to block 440. If the delayed charging benefits are less than or equal to the benefits of the baseline charging schedule, the method 400 may proceed to block 435.

In block 435, the method 400 may include sending a command to charge immediately. For example, the charging controller 140 may send a start charging command to the vehicle 110. The charging controller 140 may also send a charging schedule indicating a single charging period.

In block 440, the method 400 may include determining whether network issues may make communications unreliable. For example, the charging controller 140 may execute the communications component 148 to determine whether any network issues are present or expected. If there are network issues, the method 400 may proceed to block 445. If there are no network issues, the method 400 may proceed to block 450.

In block 445, the method 400 may include determining a revised schedule avoiding communication with the vehicle 110. For example, the charging controller 140 may execute the scheduler 146 to determine a revised schedule avoiding communication with the vehicle 110 during a period of unreliable communications 322.

In block 450, the method 400 may include sending charging start/stop commands. The charging start/stop commands may be based on the selected charging schedule.

Figure 5:
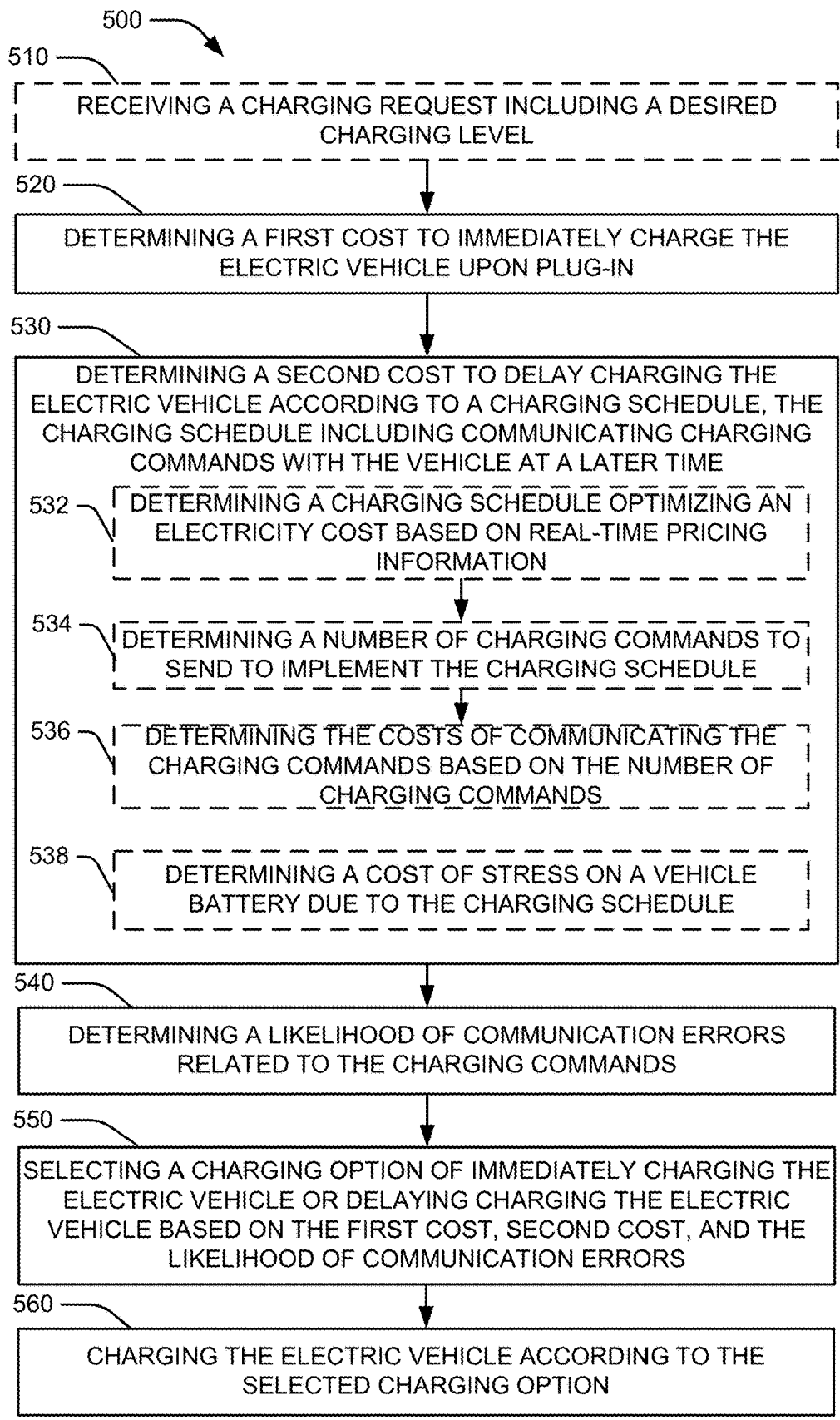
FIG. 5 illustrates a flowchart showing an exemplary method for controlling charging of an electric vehicle.

FIG. 5 illustrates a flowchart of an example method 500 for charging a electric vehicle. The method 500 may be performed by the charging controller 140 in communication with the electric vehicle 110 and the utility service 160.

In block 510, the method 500 may include receiving a charging request including a desired charging level. In an aspect, for example, the charging controller 140 may execute the communications component 148 to receive a charging request including a desired charging level from an electric vehicle 110. The charging request may be generated by the electric vehicle when the electric vehicle is plugged into the EVSE 222. The charging request may be received over the network 130.

In block 520, the method 500 may include determining a first cost to immediately charge the electric vehicle upon plug-in. Charging immediately may include starting the charging after communicating between the electric vehicle 110 and the charging controller 140. For example, charging immediately may begin within a threshold time (e.g., 5 minutes, preferably 1 minute) of plugging the electric vehicle 110 into the EVSE 122. In an aspect, for example, the charging controller 140 may execute the cost component 144 to determine the first cost to immediately charge the electric vehicle upon plug-in. The cost component 144 may communicate with the utility service 160 to obtain a current electricity cost. The cost component 144 may then determine the first cost by multiplying the current electricity cost by the estimated charge duration.

In block 530, the method 500 may include determining a second cost to delay charging the electric vehicle according to a charging schedule. The charging schedule may include communicating charging commands with the vehicle at a later time. For example, the charging controller 140 may execute the scheduler 146 to determine the charging schedule and execute the cost component 144 to determine the second cost to delay charging the electric vehicle according to the charging schedule. For instance, in block 532, the block 530 may include determining a charging schedule optimizing an electricity cost based on real-time pricing information. The scheduler 146 may determine the charging schedule optimizing an electricity cost based on real-time pricing information. The electricity cost may be calculated in terms of monetary cost and/or environmental cost. In block 534, the block 530 may include determining a number of charging commands to send to implement the charging schedule. The cost component 144 may determine the number of charging commands based on the number of charging periods in the charging schedule. In block 536, the block 530 may include determining the costs of communicating the charging commands based on the number of charging commands. The costs of communicating may include a marginal per command cost of accessing the network 130. In block 538, the block 530 may include determining a cost of stress on a vehicle battery due to the charging schedule. For example the costs of communicating charging commands may include stress and inefficiency due to starting and stopping the charging process. In an aspect, the battery 242 may need warm up before reaching optimal charging conditions and may lose efficiency when repeatedly started and stopped. The costs of communicating may be based on an estimated per command cost.

In block 540, the method 500 may include determining a likelihood of communication errors related to the charging commands. For example, the charging controller 140 may execute the communications component 148 to determine the likelihood of communication errors related to the charging commands. The communications component 148 may determine one or more of: a current network traffic load; an historical network traffic load; a current network error; or a wireless signal strength. For example, the communications component 148 may receive a current traffic load from the mobile service provider 170 and determine that communication errors are likely when the current traffic load exceeds a threshold. Similarly, the communications component 148 may correlate past communication error rates with historical network traffic loads to determine whether the current traffic load, or upcoming time period corresponds to a high rate of communication errors. As another example, the communications component 148 may determine that communication errors are likely when one or more communication errors have been recently detected (e.g., during communications with the same vehicle 110 or other electric vehicles. As another example, the communications component 148 may receive a wireless signal strength received at the vehicle 110 and determine that errors are likely when the wireless signal strength is less than a threshold. For example, a low wireless signal strength may indicate that the vehicle 110 is indoors.

In block 550, the method 500 may include selecting a charging option of immediately charging the electric vehicle or delaying charging the electric vehicle based on the first cost, second cost, and the likelihood of communication errors. In an aspect, for example, the charging controller 140 may select the charging option according to blocks 430, 435, 440, and 445 of method 400. In another aspect, the charging controller 140 may weight the second cost according to the likelihood of communication errors and compare the weighted second cost to the first cost.

In block 560, the method 500 may include charging the electric vehicle according to the selected charging option. For example, the charging controller 140 may send charging commands according to the selected charging schedule and the vehicle charging system 120 may execute the charging commands.

Figure 6:
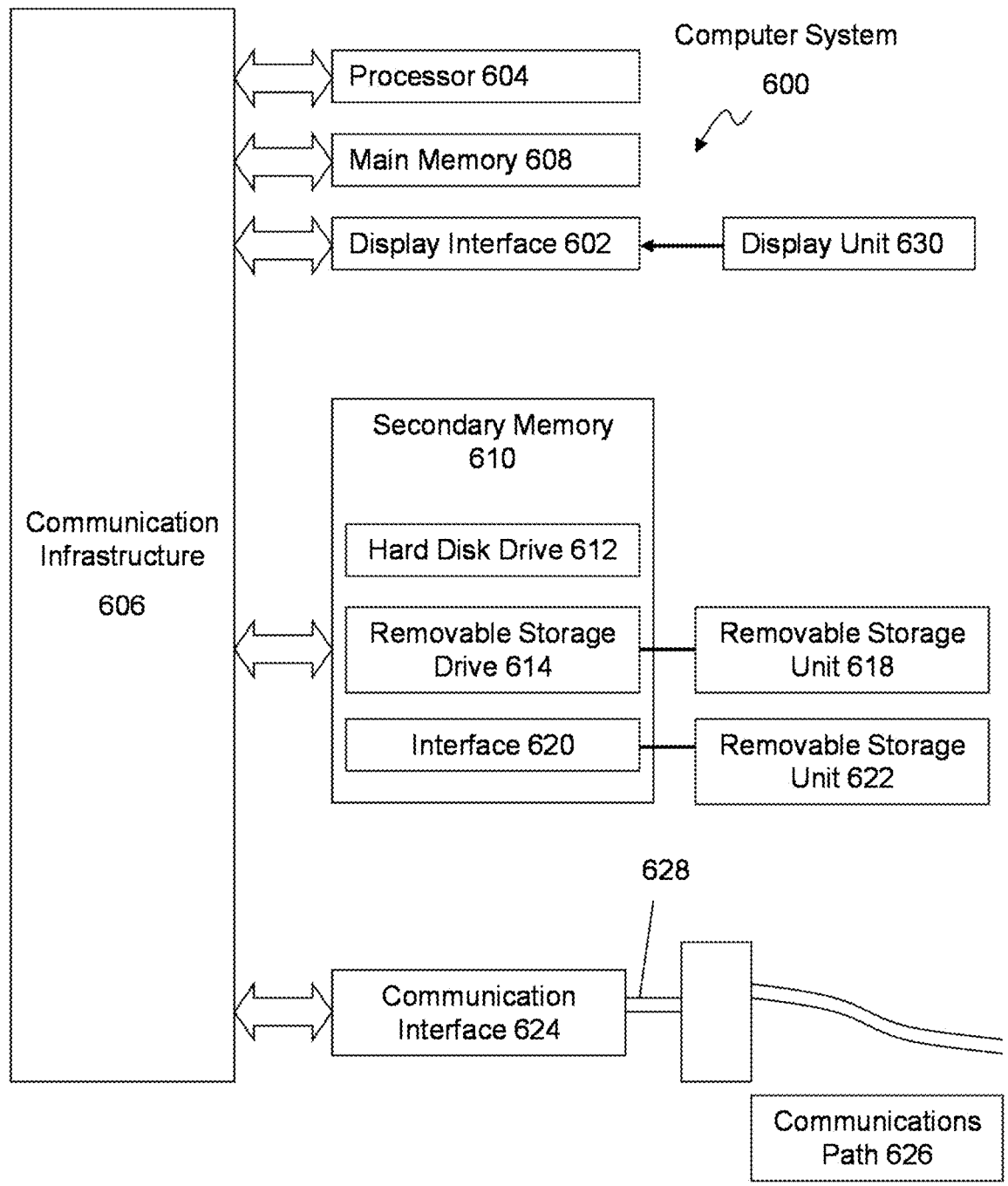
FIG. 6 presents an exemplary system diagram of various hardware components and other features, for use in accordance with aspects of the present disclosure.

Aspects of the present disclosure may be implemented using hardware, software, or a combination thereof and may be implemented in one or more computer systems or other processing systems. In one aspect, the disclosure is directed toward one or more computer systems capable of carrying out the functionality described herein. FIG. 6 presents an example system diagram of various hardware components and other features that may be used in accordance with aspects of the present disclosure. Aspects of the present disclosure may be implemented using hardware, software, or a combination thereof and may be implemented in one or more computer systems or other processing systems. In one exemplary variation, aspects of the disclosure are directed toward one or more computer systems capable of carrying out the functionality described herein. An example of such a computer system 600 is shown in FIG. 6.

Computer system 600 includes one or more processors, such as processor 604. The processor 604 is connected to a communication infrastructure 606 (e.g., a communications bus, cross-over bar, or network). Various software aspects are described in terms of this example computer system. After reading this description, it will become apparent to a person skilled in the relevant art(s) how to implement aspects of the disclosure using other computer systems and/or architectures.

Computer system 600 may include a display interface 602 that forwards graphics, text, and other data from the communication infrastructure 606 (or from a frame buffer not shown) for display on a display unit 630. Computer system 600 also includes a main memory 608, preferably random access memory (RAM), and may also include a secondary memory 610. The secondary memory 610 may include, for example, a hard disk drive 612 and/or a removable storage drive 614, representing a floppy disk drive, a magnetic tape drive, an optical disk drive, etc. The removable storage drive 614 reads from and/or writes to a removable storage unit 618 in a well-known manner. Removable storage unit 618, represents a floppy disk, magnetic tape, optical disk, etc., which is read by and written to removable storage drive 614. As will be appreciated, the removable storage unit 618 includes a computer usable storage medium having stored therein computer software and/or data.

In alternative aspects, secondary memory 610 may include other similar devices for allowing computer programs or other instructions to be loaded into computer system 600. Such devices may include, for example, a removable storage unit 622 and an interface 620. Examples of such may include a program cartridge and cartridge interface (such as that found in video game devices), a removable memory chip (such as an erasable programmable read only memory (EPROM), or programmable read only memory (PROM)) and associated socket, and other removable storage units 622 and interfaces 620, which allow software and data to be transferred from the removable storage unit 622 to computer system 600.

Computer system 600 may also include a communications interface 624. Communications interface 624 allows software and data to be transferred between computer system 600 and external devices. Examples of communications interface 624 may include a modem, a network interface (such as an Ethernet card), a communications port, a Personal Computer Memory Card International Association (PCMCIA) slot and card, etc. Software and data transferred via communications interface 624 are in the form of signals 628, which may be electronic, electromagnetic, optical or other signals capable of being received by communications interface 624. These signals 628 are provided to communications interface 624 via a communications path (e.g., channel) 626. This path 626 carries signals 628 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 680, a hard disk installed in hard disk drive 670, and signals 628. These computer program products provide software to the computer system 600. Aspects of the disclosure are directed to such computer program products.

Computer programs (also referred to as computer control logic) are stored in main memory 608 and/or secondary memory 610. Computer programs may also be received via communications interface 624. Such computer programs, when executed, enable the computer system 600 to perform various features in accordance with aspects of the present disclosure, as discussed herein. In particular, the computer programs, when executed, enable the processor 604 to perform such features. Accordingly, such computer programs represent controllers of the computer system 600.

In variations where aspects of the disclosure are implemented using software, the software may be stored in a computer program product and loaded into computer system 600 using removable storage drive 614, hard drive 612, or communications interface 620. The control logic (software), when executed by the processor 604, causes the processor 604 to perform the functions in accordance with aspects of the disclosure as described herein. In another variation, aspects are implemented primarily in hardware using, for example, hardware components, such as application specific integrated circuits (ASICs). Implementation of the hardware state machine so as to perform the functions described herein will be apparent to persons skilled in the relevant art(s).

In yet another example variation, aspects of the disclosure are implemented using a combination of both hardware and software.

Figure 7:
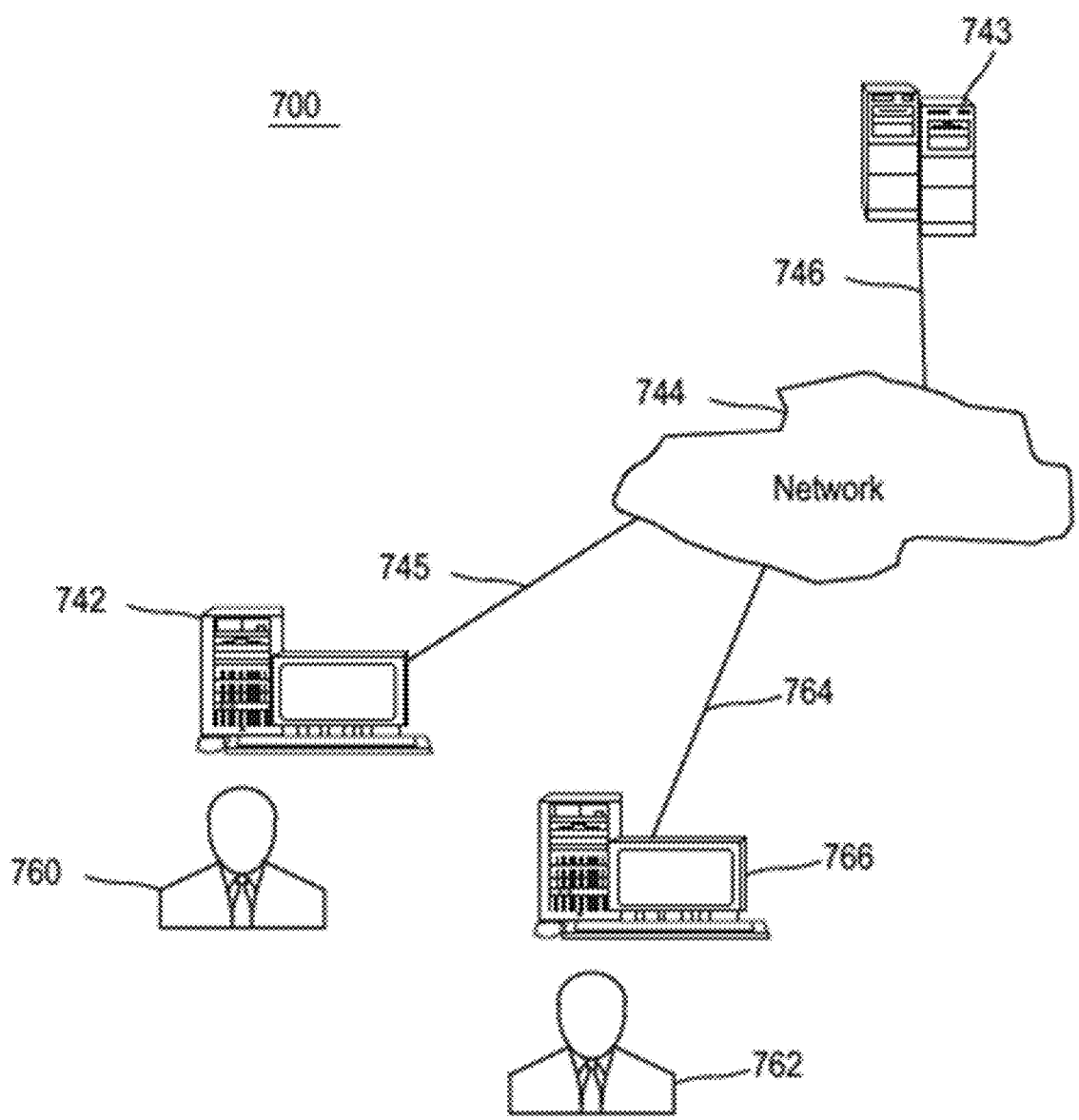
FIG. 7 is a block diagram of various exemplary system components, for use in accordance with aspects of the present disclosure.

FIG. 7 is a block diagram of various example system components that may be used in accordance with aspects of the present disclosure. For example, the various components may be within the vehicle 110, or only some of the components may be within the vehicle 110, and other components may be remote from the vehicle 110. The system 700 includes one or more accessors 760, 762 (also referred to interchangeably herein as one or more "users") and one or more terminals 742, 766 (such terminals may be or include, for example, various features of the charging controller 140, vehicle charging system 120, or mobile device 180). In one aspect, data for use in accordance with aspects of the present disclosure is, for example, input and/or accessed by accessors 760, 762 via terminals 742, 766, such as personal computers (PCs), minicomputers, mainframe computers, microcomputers, telephonic devices, or wireless devices, such as personal digital assistants ("PDAs") or a hand-held wireless devices coupled to a server 743, such as a PC, minicomputer, mainframe computer, microcomputer, or other device having a processor and a repository for data and/or connection to a repository for data, via, for example, a network 744, such as the Internet or an intranet, and couplings 745, 746, 764. The couplings 745, 746, 764 include, for example, wired, wireless, or fiber optic links. In another example variation, the method and system in accordance with aspects of the present disclosure operate in a stand-alone environment, such as on a single terminal.

The aspects of the disclosure discussed herein may also be described and implemented in the context of computer-readable storage medium storing computer-executable instructions. Computer-readable storage media includes computer storage media and communication media. For example, flash memory drives, digital versatile discs (DVDs), compact discs (CDs), floppy disks, and tape cassettes. Computer-readable storage media may include volatile and nonvolatile, removable and non-removable media implemented in any method or technology for storage of information such as computer readable instructions, data structures, modules or other data.

It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A method of charging an electric vehicle, comprising:
   determining, by a charging controller located remotely from the electric vehicle, a first cost to immediately charge the electric vehicle upon plug-in;
   determining, by the charging controller, a second cost to delay charging the electric vehicle according to a charging schedule, the charging schedule including communicating charging commands between the charging controller and the electric vehicle at a later time over a communications network;
   determining, by the charging controller, a likelihood of communication errors related to communicating the charging commands over the communications network; and
   selecting, by the charging controller, a charging option of immediately charging the electric vehicle or delaying charging the electric vehicle based on the first cost, the second cost, and the likelihood of communication errors.

2. The method of claim 1, wherein the second cost includes costs of communicating the charging commands.

3. The method of claim 2, wherein determining the second cost comprises:
   determining the charging schedule by optimizing an electricity cost based on real-time pricing information, the charging schedule including one or more start or stop times;
   determining a number of charging commands to send to implement the charging schedule; and
   determining the costs of communicating the charging commands based on the number of charging commands.

4. The method of claim 3, wherein determining the second cost comprises determining a cost of stress on a vehicle battery due to the charging schedule.

5. The method of claim 1, wherein determining the likelihood of communication errors related to charging commands comprises determining one or more of: a current network traffic load; an historical network traffic load; a current network error; or a wireless signal strength.

6. The method of claim 1, further comprising:
   receiving a demand response signal from a utility operator;
   redetermining the first cost, the second cost, and the likelihood of communication errors related to charging commands; and
   selecting a second charging option for the electric vehicle in respons the demand response signal.

7. The method of claim 1, further comprising:
   receiving an excess renewable signal from a utility operator;
   redetermining the first cost, the second cost, and the likelihood of communication errors related to charging commands; and
   selecting a second charging option for the electric vehicle in response to the excess renewable signal.

8. The method of claim 1, further comprising charging the electric vehicle according to the selected charging option.

9. The method of claim 1, wherein the first cost and the second cost are monetary costs.

10. The method of claim 1, wherein the first cost and the second cost are environmental costs.

11. An electric vehicle charging system, comprising:
    a memory storing computer executable instructions; and
    a processor that executes the computer executable instructions to:
    determine, at a charging controller, a first cost to immediately charge an electric vehicle upon plug-in to an electric vehicle supply equipment located remotely from the charging controller;
    determine, at the charging controller, a second cost to delay charging the electric vehicle according to a charging schedule, the charging schedule including communicating charging commands between the charging controller and the electric vehicle at a later time over a communications network;
    determine, at the charging controller, a likelihood of communication errors related to communicating the charging commands over the communications network; and
    select, at the charging controller, a charging option of immediately charging the electric vehicle or delaying charging the electric vehicle based on the first cost, the second cost, and the likelihood of communication errors.

12. The electric vehicle charging system of claim 11, wherein the second cost includes costs of communicating the charging commands.

13. The electric vehicle charging system of claim 12, wherein the processor:
    determines the charging schedule by optimizing an electricity cost based on real-time pricing information, the charging schedule including one or more start or stop times;
    determines a number of charging commands to send to implement the charging schedule; and
    determines the costs of communicating the charging commands based on the number of charging commands.

14. The electric vehicle charging system of claim 12, wherein the processor determines a cost of stress on a vehicle battery due to the charging schedule.

15. The electric vehicle charging system of claim 11, wherein the processor determines the likelihood of communication errors related to charging commands by determining one or more of: a current network traffic load; an historical network traffic load; a current network error; or a wireless signal strength.

16. The electric vehicle charging system of claim 11, wherein the processor:
    receives a demand response signal or an excess renewable signal from a utility operator;

redetermines the first cost, the second cost, and the likelihood of communication errors related to charging commands; and selects a second charging option for the electric vehicle in response to the demand response signal or the excess renewable signal.

17. The electric vehicle charging system of claim 11, wherein the processor charges the electric vehicle according to the selected charging option.

18. The electric vehicle charging system of claim 11, wherein the first cost and the second cost are monetary costs.

19. The electric vehicle charging system of claim 11, wherein the first cost and the second cost are environmental costs.

20. A non-transitory computer-readable medium storing computer executable code for charging an electric vehicle, comprising code to:

determine, by a charging controller located remotely from the electric vehicle, a first cost to immediately charge the electric vehicle upon plug-in;

determine, by the charging controller, a second cost to delay charging the electric vehicle according to a charging schedule, the charging schedule including communicating charging commands between the charging controller and the electric vehicle at a later time over a communications network;

determine, by the charging controller, a likelihood of communication errors related to communicating the charging commands over the communications network; and, select, by the charging controller, a charging option of immediately charging the electric vehicle or delaying charging the electric vehicle based on the first cost, the second cost, and the likelihood of communication errors.

* * * * *